(12) United States Patent
Lehtonen

(10) Patent No.: US 6,662,986 B2
(45) Date of Patent: Dec. 16, 2003

(54) MOBILE PHONE STRAP HOLDER APPARATUS AND METHOD

(75) Inventor: Jarmo Lehtonen, Littoinen (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/970,777

(22) Filed: Oct. 5, 2001

(65) Prior Publication Data

US 2003/0066856 A1 Apr. 10, 2003

(51) Int. Cl.[7] ................................................. A45C 1/04
(52) U.S. Cl. ..................... 224/675; 224/222; 224/578; 224/672; 224/674; 224/676
(58) Field of Search .................. 224/675, 578, 224/600, 220, 221, 222, 662, 671, 672, 674, 676, 255, 930; 379/446, 455, 449; 455/90

(56) References Cited

U.S. PATENT DOCUMENTS 5,586,704 A * 12/1996 Alexander et al. .......... 224/605
5,709,012 A * 1/1998 Ebashi ........................ 224/667
6,094,566 A 7/2000 Dasent et al.
D447,864 S * 9/2001 Casparian ..................... D3/218
6,352,186 B1 * 3/2002 Endo ........................... 224/254

FOREIGN PATENT DOCUMENTS

| DE | 198 33 517 A1 | 1/2000 |
| GB | 2 266 452 A | 11/1993 |
| WO | WO 99/56448 | 11/1999 |

* cited by examiner

Primary Examiner—Gregory Vidovich
Assistant Examiner—Maerena W Brevard
(74) Attorney, Agent, or Firm—Antonelli, Terry, Stout & Kraus, LLP

(57) ABSTRACT

The invention involves a mobile phone and strap apparatus for carrying a mobile phone. A mobile phone is provided with openings in the corners of the mobile phone housing through which a flexible line is passed and cooperates with a strap and latch that secures ends of the flexible line. The strap, latch and flexible line are adapted to secure an object between the mobile phone housing, the flexible line and strap when ends of the flexible line are drawn through the latch.

8 Claims, 3 Drawing Sheets

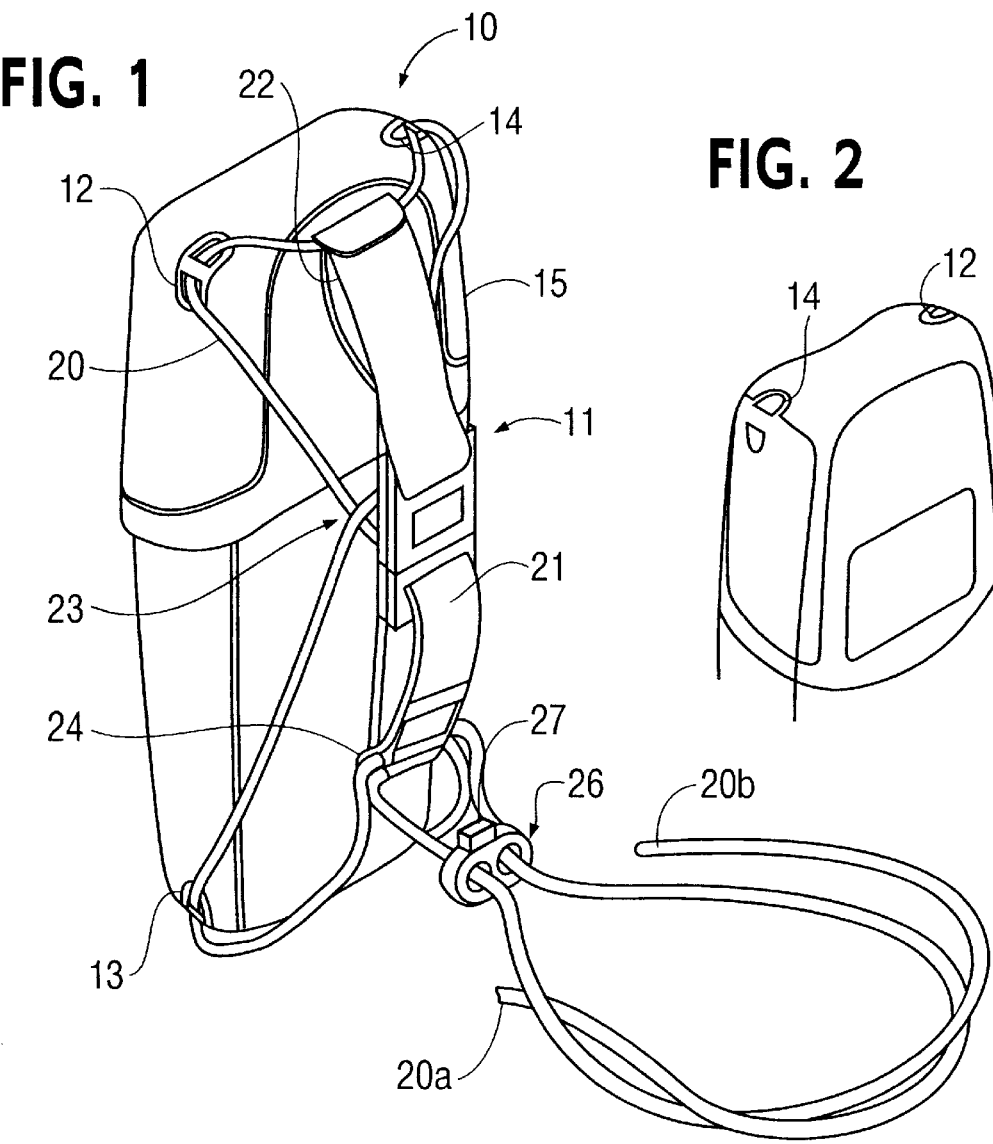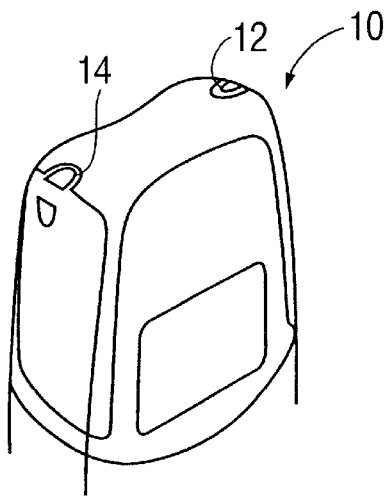

MOBILE PHONE STRAP HOLDER APPARATUS AND METHOD

FIELD

This invention relates to carrying apparatus for a mobile device.

BACKGROUND OF THE INVENTION

Throughout the world users of mobile devices such as mobile phones have grown so attached to the use of their mobile phones that they attempt to carry them everywhere. This is not a difficult task in most working environments, when a simple belt mounted holster can carry the mobile phone. It is also common to secure a carrying strap to a single corner of the mobile phone housing to thereby allow the user of the phone to place the phone in a pocket or purse with the strap conveniently extending from the pocket or purse. Use of the phone simply requires the user to grip the single carrying strap and withdraw the phone from pocket or purse to either make or receive a call. In addition to mobile phone holsters, straps designed to wrap around the mobile device and around a portion of the body, have also developed. Some holster arrangements, as shown and described in U.S. Pat. No. 5,586,704, issued to Alexander, et al. on Dec. 24, 1996, provide a shoulder holster for carrying a portable telephone near the body of a user. The shoulder holster is provided with an opening into which the mobile phone may be placed. The holster itself is provided with a hook surface on the back of the holster that cooperates with a loop surface on a panel of the strap that passes over a shoulder, down a portion of the user's back and then around and underneath the arm pit of the user, where it is then secured to the strap panel. Similar approaches have been taken to strap a mobile phone in a holster strapped to a leg of a golfer as is shown in U.S. Design Pat. No. D447,864 to Casparian, issued Sep. 18, 2001.

As adequate as these just described approaches may be in the environments for which they were designed, major drawbacks arise in their use when these approaches are called upon to carry a mobile phone in environments where the user is highly active, such as hiking, running or golfing. In these instances the mobile phone user wants to secure the mobile phone to an arm, wrist, neck, a golf bag or on the body when the user is simply moving about.

The instant invention avoids the problems inherent in holster/carrying strap arrangements of the past. The invention is remarkably simple and exceedingly expeditious to use in a nearly universal manner in a host of environments where the mobile phone user desires quick and easy access to his/her phone.

SUMMARY OF THE INVENTION

The mobile phone and strap for the mobile phone of the instant invention includes a mobile phone having a housing that includes at least two openings in the housing to accommodate a flexible line, for use with a strap adapted to accommodate the flexible line, when the line passes through one of the openings and a portion of the strap and then through another opening, whereupon the ends of the flexible line intersect one another before passing through another portion of the strap. A latch element is provided which is adapted to secure the ends of the flexible line such that an object disposed between the strap and the intersecting flexible line becomes secured between the mobile phone and strap, when ends of the flexible line are drawn through the latch element and a latch element secures the lines one to the other.

More specifically, the mobile phone housing includes at least four openings in the housing to accommodate a flexible line for use with a strap adapted to accommodate the flexible line when the line passes through one of the openings and a portion of the strap and then through another opening, whereupon the ends of the flexible line intersect one another before the ends of the line pass through other openings and another portion of the strap. A latch element is provided, which is adapted to secure the ends of the flexible line such that an object disposed between the strap and the intersecting flexible line becomes secured between the mobile phone and strap when ends of the flexible line are drawn through the latch element and a latch element secures the lines one to the other. In this preferred embodiment the four openings in the housing are disposed in regions remote from each other in an array in the housing to be proximate the corners of the mobile phone housing.

The invention further embraces a method of securing a mobile phone to an object. Specifically, the invention is comprised of the following steps.

First, providing a mobile phone housing that includes at least two openings in the housing.

Second, providing a flexible line.

Third, providing a strap that is adapted to provide a portion thereof that will accommodate the passage of the flexible line there through.

Fourth, providing a latch element that is adapted to secure the ends of the line when the ends of the line have passed through the latch element.

Fifth, passing an end of the flexible line through one of the openings and a portion of the strap and then through another opening.

Sixth, bringing ends of the line across each other in an intersecting manner and thereafter through the latch element.

Seventh, drawing the ends of the line through the latch element, such that an object disposed between the intersecting lines and strap thereby firmly secures the mobile phone to the object.

A primary advantage/objective of this invention resides in its effortless utility. It provides a mobile phone having a housing that functions not only to protect the mobile phone while in active use but also provides a number of openings in the housing that allow the mobile phone to utilize a flexible line and a strap to secure the phone in a host of ways to objects, and individuals in a variety of physical locations.

Another advantage/object of the invention resides in the simple flexible line and strap and a latch mechanism that readily allows the mobile phone to be securely fastened in place on an object or person.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings wherein:

FIG. 1 is a perspective view of a preferred embodiment of the invention;

FIG. 2 is a is a front view of an upper portion of a mobile phone as shown in FIG. 1;

DETAILED DESCRIPTION OF THE PREFERRED EMBODIMENT

Figure 4:
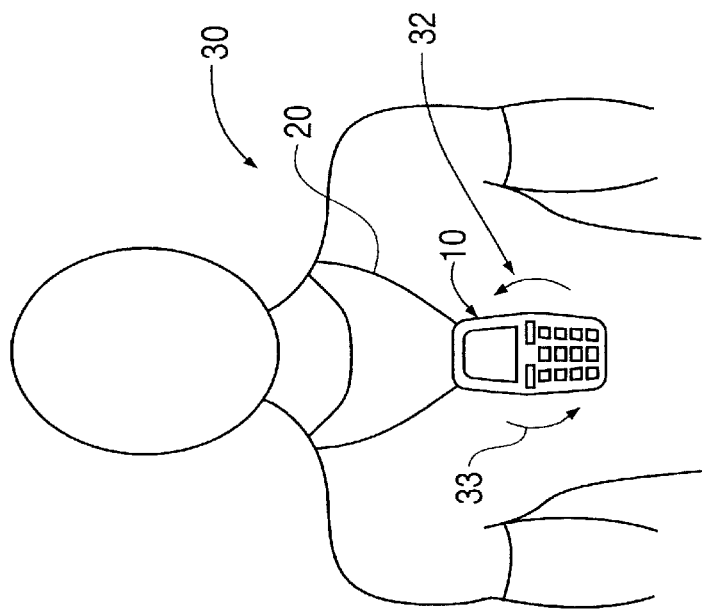
FIG. 4 is an illustration of the invention in use on the neck of a person.

Reference is now made to FIG. 1 which illustrates a preferred embodiment of the invention in which the backside of a mobile phone 10 is shown. The mobile phone 10 has a housing 15 which is provided with four corner openings 12, 13, 14 (FIG. 2) and a corner opening not shown in the drawing but identical to the opening 13 but hidden from view in the other corner and therefore not visible in this illustration. A flexible line 20 is shown passing through the corner openings 12, 13, 14 and the corner opening not shown as noted above. A strap holder 11, indicated by lead line and arrowhead, is positioned as shown near the backside of the mobile phone 10.

It will be observed that flexible line 20 has a pair of ends 20a, 20b that will be observed to pass through a latch 26, that includes a latch release button 27. If one will visually trace the flexible line 20, it will be seen that the flexible line 20 passes through one of the corner openings 14 (FIG. 1) and a portion 22 of the strap 21 and then through the corner opening 12, whereupon the line 20 is brought together and they intersect one another at the location indicated by reference arrow 23. The ends 20a, 20b of the line 20 then pass through the corner opening 13 and the corner opening not shown. The ends 20a, 20b of the line 20 then are passed through a strap portion 24 as is shown and then through the latch 26.

It is to be understood that when the latch 26 is held secure by a hand not shown and when the latch release button is depressed the ends 20a, 20b may be grasped by another hand and pulled so as to draw the line 20 through the latch and object (not shown) that is disposed between the strap 21 and the intersecting line 20, drawing the ends of the line 201, 20b through the latch 26, will secure an object between the mobile phone 10 and the strap holder 11.

In FIG. 1 no object has been shown between the mobile phone 10 and the strap holder 11 as the physical presence of such an object between the mobile phone 10 and strap 21 in FIG. 1 would obscure the cooperation of the flexible line 20 and strap holder 11 as well as the corner openings 12, 13 and 14.

Attention now is directed to FIGS. 3 through 10 which illustrate the multifaceted utility of this simple invention.

Figure 3:
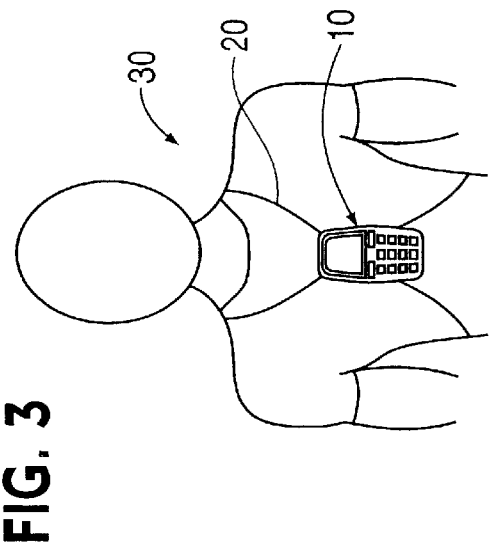
FIG. 3 is an illustration of the invention in use on the neck and body of a person.

FIG. 3 depicts a mobile phone 10 secured by flexible line 20 which passes around the neck and body of person 30. FIG. 4 shows the mobile phone 10 supported by the flexible line 20 as the line 20 passes around a neck of the person 30.

The mobile phone 10 may be suspended by either of its corner openings as is indicated by the arrows 32, 33 which are intended to suggest that the mobile phone 10 may be reversed in its position.

Figure 6:
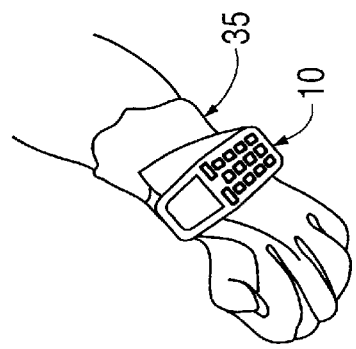
FIG. 6 is an illustration of the invention in use on the wrist of a person.
Figure 5:
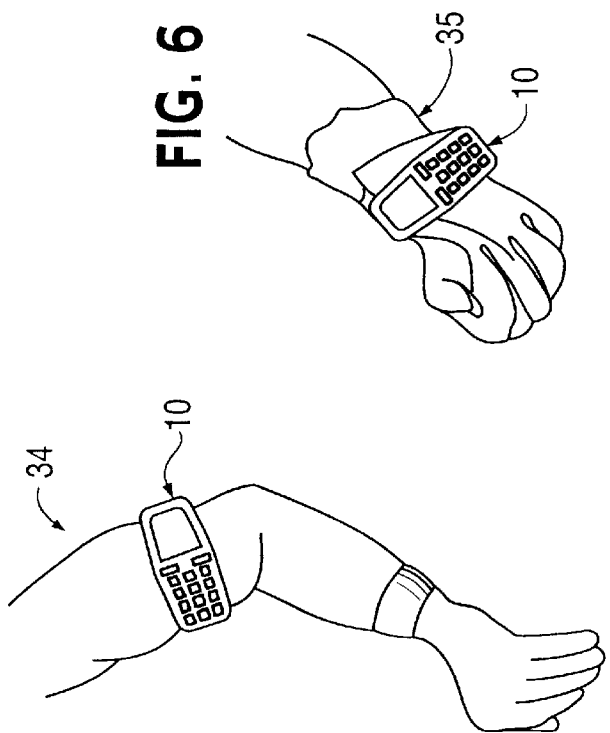
FIG. 5 is an illustration of the invention in use on the arm of a person.

FIG. 5 shows a mobile phone 10 secured to an arm 34 whereas FIG. 6 has the mobile phone 10 secured to a wrist 35.

Figure 7:
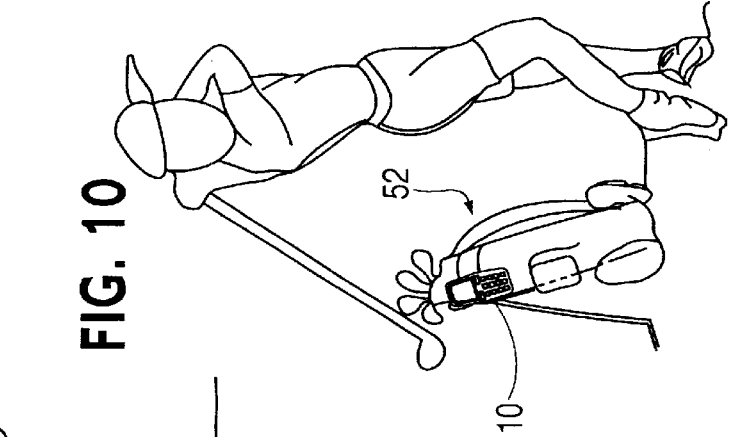
FIG. 7 is an illustration of the invention in use on a hiker's backpack strap.

FIG. 7 is intended to convey an action FIG. 40 such as a hiker or backpacker with the mobile phone 10 secured to a backpack harness strap 41.

Figure 8:
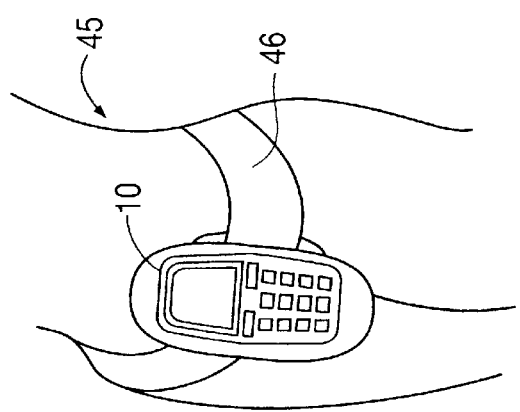
FIG. 8 is an illustration of the invention in use in a draped fashion, secured to a belt disposed around a body of a person.
Figure 9:
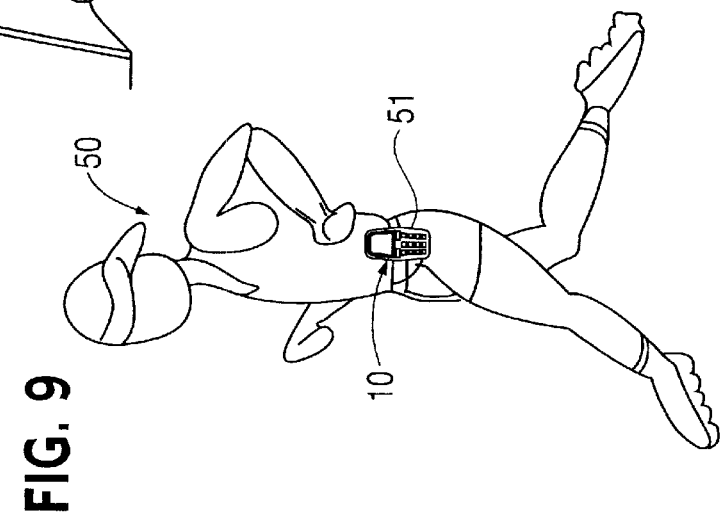
FIG. 9 is an illustration of the invention in use by a jogger.

FIG. 8 depicts a partial section of a human FIG. 45 with a body strap 46 onto which has been secured the mobile phone 10. FIG. 9 shows yet another action FIG. 50 jogging with the mobile phone positioned as shown on the belt 51.

Figure 10:
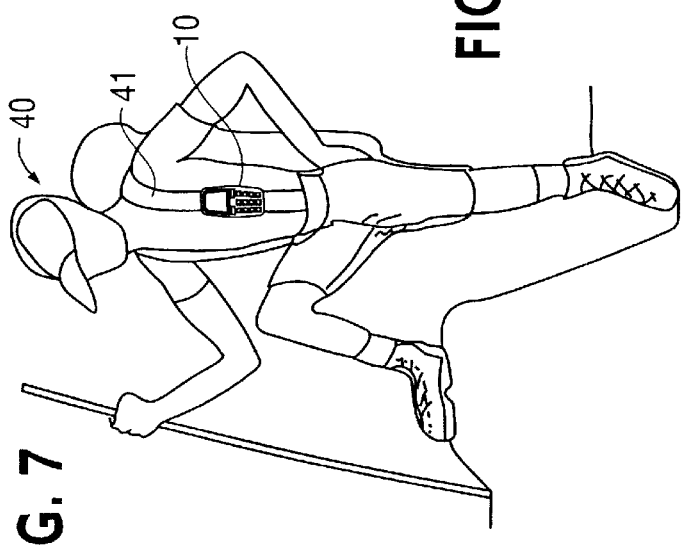
FIG. 10 is an illustration of the invention in use on an object such as a golf bag.

In FIG. 3 to FIG. 9 the invention has been employed to secure a mobile phone 10 to various portions of a human anatomy. FIG. 10 is intended to convey yet another useful manner of employing the invention where the object to which the mobile phone 10 is secured is a golf bag 52.

In a most complete sense the invention includes the following steps for securing a mobile phone to an object.

providing a mobile phone housing that includes at least four openings in the housing;

providing a flexible line;

providing a strap that is adapted to provide at least two portions thereof that will accommodate the passage of the flexible line there through;

providing a latch element that is adapted to secure the ends of the line when the ends of the line have passed through the latch element;

passing an end of the flexible line through one of the openings and a portion of the strap and then through another opening.

bringing ends of the line across each other in an intersecting manner and thereafter through first one of the other openings whereas the other end of the line passes through the remaining opening and then through the other portion of the strap and thereafter through latch element, and then;

drawing the ends of the line through the latch element, such that an object disposed between the intersecting lines and strap thereby firmly secures the mobile phone to the object.

Although the present invention has been described herein with reference to a particular method, materials and embodiments, the present invention is not intended to be limited to the particulars disclosed herein. Rather, the present invention extends to all functionally equivalent structures, methods and use, such as are within the scope of the appended claims.

What is claimed is:

1. A mobile phone and a strap holder for the mobile phone, the mobile phone and strap holder comprising:

a mobile phone having a housing that includes at least two openings in the housing to accommodate a flexible line for use with a strap adapted to accommodate the flexible line when the line passes through one of the openings and a portion of the strap and then through the other opening, whereupon the ends of the flexible line intersect one another before passing through another portion of the strap, whereupon a latch element is adapted to secure the ends of the flexible line such that an object disposed between the strap and the intersecting flexible line becomes secured between the mobile phone and strap when ends of the flexible line are drawn through the latch element and the latch element secures the lines one to the other.

2. The mobile phone and strap holder of claim 1 wherein the openings in the housing are disposed in regions of the housing remote from each other.

3. The mobile phone and strap holder of claim 1 wherein the mobile phone housing includes at least four openings.

4. The mobile phone and strap holder of claim 3 wherein the four openings in the housing are disposed in regions remote from each other in an array in the housing to be proximate corners of the mobile phone housing.

5. A mobile phone and a strap holder for the mobile phone, the mobile phone and strap holder comprising:

a mobile phone having a housing that includes at least four openings in the housing to accommodate a flexible line for use with a strap adapted to accommodate the flexible line when the line passes through one of the openings and a portion of the strap and then through another opening, whereupon the ends of the flexible line intersect one another before the ends of the line pass through other openings and another portion of the strap, whereupon a latch element is adapted to secure the ends of the flexible line such that an object disposed between the strap and the intersecting flexible line becomes secured between the mobile phone and strap when ends of the flexible line are drawn through the latch element and the latch element secures the lines one to the other.

6. The mobile phone and strap holder of claim 5 wherein the four openings in the housing are disposed in regions remote from each other in an array in the housing to be proximate corners of the mobile phone housing.

7. A method of securing a mobile phone to an object comprising the following steps:

(a) providing a mobile phone housing that includes at least two openings in the housing, (b) providing a flexible line, (c) providing a strap that is adapted to provide a portion thereof that will accommodate the passage of the flexible line there through, (d) providing a latch element that is adapted to secure ends of the line when the ends of the line have passed through the latch element (e) passing an end of the flexible line through one of the openings and a portion of the strap and then through another opening, (f) bringing ends of the line across each other in an intersecting manner, (g) passing the ends through another portion of the strap and thereafter through the latch element, and then (h) drawing the ends of the line through the latch element, such that an object disposed between the intersecting lines and strap thereby firmly secures the mobile phone to the object.

8. A method of securing a mobile phone to an object comprising the following steps:

(a) providing a mobile phone housing that includes at least four openings in the housing, (b) providing a flexible line, (c) providing a strap that is adapted to provide at least two portions thereof that will accommodate the passage of the flexible line there through, (d) providing a latch element that is adapted to secure the ends of the line when the ends of the line have passed through the latch element (e) passing an end of the flexible line through one of the openings and a portion of the strap and then through another opening, (f) bringing ends of the line across each other in an intersecting manner and thereafter through first one of the other openings whereas the other end of the line passes through the remaining opening and then through the other portion of the strap and there after through latch element, and then (g) drawing the ends of the line through the latch element, such that an object disposed between the intersecting lines and strap thereby firmly secures the mobile phone to the object.

\* \* \* \* \*